(12) United States Patent
Salzmann

(10) Patent No.: US 9,103,155 B2
(45) Date of Patent: Aug. 11, 2015

(54) WINDOW PANE FASTENING

(71) Applicant: Decoma (Germany) GmbH, Sulzbach (DE)

(72) Inventor: Heiner Salzmann, Uhingen (DE)

(73) Assignee: Decoma (Germany) GmbH, Sulzbach (DE)

( * ) Notice: Subject to any disclaimer, the term of this patent is extended or adjusted under 35 U.S.C. 154(b) by 0 days.

(21) Appl. No.: 13/936,150

(22) Filed: Jul. 6, 2013

(65) Prior Publication Data

US 2014/0007510 A1    Jan. 9, 2014

(30) Foreign Application Priority Data

Jul. 6, 2012   (DE) .......................... 10 2012 013 340

(51) Int. Cl.
*E06B 7/23*    (2006.01)
*B60J 1/00*    (2006.01)
*E06B 7/24*    (2006.01)

(52) U.S. Cl.
CPC ............... *E06B 7/2312* (2013.01); *B60J 1/005* (2013.01); *B60J 1/006* (2013.01); *E06B 7/24* (2013.01)

(58) Field of Classification Search
USPC ........ 52/204.591, 204.62, 208; 296/201, 84.1
IPC ......... E06B 3/5409,3/5842, 2003/6223, 7/2312, E06B 7/24; B60J 1/005, 1/006
See application file for complete search history.

(56) References Cited

U.S. PATENT DOCUMENTS 4,571,278 A * 2/1986 Kunert .......................... 156/108
4,724,022 A * 2/1988 Armstrong ...................... 156/99
5,062,248 A * 11/1991 Kunert ............................. 52/208
5,421,130 A * 6/1995 Weber et al. ..................... 52/208
5,522,636 A * 6/1996 Kolar, Jr. .................. 296/146.15
5,667,896 A    9/1997 Carter et al.
5,711,119 A    1/1998 Cornils et al.

(Continued)

FOREIGN PATENT DOCUMENTS

CN    201246075 Y    5/2009
EP      1033273 A2    9/2000

(Continued)

OTHER PUBLICATIONS

Wang, Qinqin, Chinese Patent Application No. 2013102843464 First Office Action, dated Feb. 28, 2015, 9 pages, including 5 pages English translation.

(Continued)

*Primary Examiner* — Gregory Strimbu
(74) *Attorney, Agent, or Firm* — Jordan IP Law, LLC; Todd A. Vaughn

(57) ABSTRACT

A window pane fastening for a motor vehicle and which is configured to fasten and/or seal a window pane to the body of the motor vehicle. The window pane fastening includes a first support element attached to the window pane, and a second support element attached to the motor vehicle body. The support element has a first support body with a first support area attached to the window pane and a second support area having a plurality of spaced apart web members extending perpendicular relative to the plane of the window pane and in parallel to one another to define grooves. A flexible component is provided into each of the grooves and the second support element is received into a corresponding one of the grooves to engage a corresponding one of the flexible components.

11 Claims, 1 Drawing Sheet

(56) References Cited

U.S. PATENT DOCUMENTS

| | | | | |
|---|---|---|---|---|
| 5,988,730 A | * | 11/1999 | Bekaert | 296/146.15 |
| 6,136,122 A | * | 10/2000 | Boaz | 156/108 |
| 6,263,627 B1 | * | 7/2001 | Schonenbach et al. | 52/208 |
| 6,490,788 B2 | * | 12/2002 | Carter et al. | 29/854 |
| 6,935,677 B2 | * | 8/2005 | Nania | 296/146.14 |
| 2011/0072729 A1 | * | 3/2011 | Otsuka et al. | 49/490.1 |

FOREIGN PATENT DOCUMENTS

| | | |
|---|---|---|
| EP | 0857116 B1 | 1/2002 |
| EP | 1621384 B1 | 3/2009 |
| EP | 2159154 A1 | 3/2010 |
| FR | 1388582 A | 2/1965 |
| FR | 2858950 B1 | 2/2005 |
| FR | 2935347 A1 | 3/2010 |

OTHER PUBLICATIONS

Wang, Qinqin, Chinese Patent Application No. 2013102843464 Search Report, dated Feb. 14, 2015, 4 pages, including 2 pages English translation.

* cited by examiner

WINDOW PANE FASTENING

CROSS-REFERENCE TO RELATED APPLICATIONS

The present application claims priority under 35 U.S.C. §119 to German Patent Application No. DE 10 2012 013 340.5 (filed on (Jul. 6, 2012), which is hereby incorporated by reference in its entirety.

TECHNICAL FIELD

A window pane fastening structurally configured to fasten and/or seal a window pane to a vehicle body part or another part of a motor vehicle.

BACKGROUND

In order to fasten and seal a window pane to a vehicle body part in a motor vehicle, it is known to injection-mould plastics material around the edge of the window pane and to clamp the edge around which plastics material has thus been injection-moulded in a mould part. Such a solution is disclosed in FR 2 858 950 B1.

Fastening or clamping a window pane by way of hard plastics material is proposed in EP 0 857 116 B1, in which this type of window pane fastening completely encompasses the external periphery of the window pane. The window pane surround is made of hard plastics material also comprises fastening elements for attaching to a vehicle body part. Injection moulding using a more flexible plastics material is also provided. The injection-moulding serves for the sealed support against a vehicle body part.

EP 1 621 384 B1 discloses a tailgate structure for a motor vehicle, and includes a metal frame, an external trim part, an internal part as well as a frameless window pane. The window pane may be fastened by way of a plug-in flange or even by adhesive bonding to the frame. Adhesive bonding of the window pane over the surface of its peripheral region, however, permits stresses to be formed in the glass, as adequate compensation is not present when a correspondingly large quantity of adhesive is not used.

A drawback with adhesive bonding of the window pane is that, when put in position, the window pane has to be positioned on the corresponding component. Moreover, the window pane has to be fixed in position until the bonding agent has completely cured. Such a window pane fastening is thus also disadvantageous in terms of the manufacturing process.

FR 1388582 A discloses a window pane fastening for fastening and/or sealing a window pane to a vehicle body part or another part of a vehicle. Support elements on the two components, which are fastened by being clipped on, serve as a connection between the two parts. The support components in this case encompass the window pane and the other parts of the vehicle. The support components are not injection-moulded thereon and are interlocked in the form of snap hooks.

U.S. Pat. No. 5,711,119A discloses a connection between a window pane and the window frame, in which a connecting layer is applied to the window pane, onto which a profiled frame composed of an elastomer is injection-moulded. The injection-moulded frame comprises a U-shaped profile for receiving a snap hook. The use of snap connections, however, does not permit easy assembly, and the positioning of the components relative to one another has to be accurate during assembly.

SUMMARY

Embodiments are directed to a window pane fastening having an enhanced structural design.

In accordance with embodiments, a window pane fastening configured to fasten and/or seal a window pane to a motor vehicle, the window pane fastening including at least one of the following: a first support element including a first support body with a first support area attached to the window pane and a second support area having a plurality of spaced apart first web members extending perpendicular relative to the plane of the window pane and in parallel to one another to define grooves; a flexible component provided into the grooves; and a second support element attached at one end to the motor vehicle body and at another end received into a corresponding groove to engage a corresponding flexible component.

In accordance with embodiments, a window pane fastening for a motor vehicle and which is configured to fasten and/or seal a window pane to a motor vehicle, the window pane fastening including at least one of the following: a first support element having a first support body attached to a window pane, the first support element having a plurality of spaced apart first web members extending perpendicular relative to the plane of the window pane and in parallel to one another to define grooves; a second support element having a plurality of ribs extending parallel to one another into attached at one end to a body of the motor vehicle body and at another end received into a corresponding groove; and a flexible component between the first support element and the second support element, the flexible component provided in corresponding grooves and engaged by a corresponding rib of the second support element.

In accordance with embodiments, a motor vehicle window pane fastening configured to fasten and/or seal a window pane to a motor vehicle, the motor vehicle window pane fastening including at least one of the following: a labyrinth seal including (i) a first support element having a first support body attached to a window pane, the first support element having a plurality of spaced apart first web members extending perpendicular relative to the plane of the window pane and in parallel to one another to define grooves; (ii) a second support element having a plurality of ribs extending parallel to one another into attached at one end to the motor vehicle body and at another end received into a corresponding groove; and (iii) a flexible component between the first support element and the second support element, the flexible component provided in corresponding grooves and engaged by a corresponding rib of the second support element; and a spacer element provided at the distal end of each first web member of the first support element and configured to adjust the depth of penetration of the ribs of the second support element in the grooves of the first support element.

In accordance with embodiments, a window pane fastening is provided and configured to fasten and/or seal a window pane to a vehicle body part or another part of a motor vehicle, and includes a first support element attached to the window pane, a second support element attached to the vehicle body part, wherein the first and second support elements includes grooves and ribs penetrating the grooves, as well as a flexible component between the first and second support elements, via which the fixing and/or sealing of the components takes place relative to one another and thus of the window pane on and/or relative to the vehicle body part.

Embodiments provides fastening and/or sealing of the window pane using two halves of a labyrinth seal, in which the first half of the seal forms a first support element which is attached to the window pane, and the second half of the seal forms the second support element on the vehicle body, the vehicle body part. The window pane is sealed and/or fixed by a flexible component, which is may be composed of a thermoplastic material, between the two support elements, in which the dimensions of the structure of the first and second support elements are such that the first and second support elements do not come into direct contact, i.e., compensation is possible. The labyrinth seal, in addition to the flexible component between the window pane and the vehicle body part, thus ensure at least the sealing function and may additionally effect the fastening of the window pane.

In accordance with embodiments, it is provided that the first support element, the first half of the labyrinth seal, comprises a thermoplastic material of corresponding hardness which is injection-moulded directly onto the window pane and/or is configured as a region already formed on the window pane. The second support element, the second half of the labyrinth seal, may be manufactured from the same material or a correspondingly adapted material. In particular, the element may also be injection-moulded onto the vehicle body part. Also it is possible for the second support element to be produced as a prefabricated profiled part, for example, as an extruded profile, and to be bonded to the part on which the window pane is to be fastened.

The flexible component which fills up the space of the labyrinth seal between the first and second support elements is configured as a thermoplastic material of correspondingly reduced hardness. The flexibility of the material ensures the fixing and the corresponding tolerance compensation of the window pane relative to the component, i.e., the operation of the window pane which is required both in thermal terms and in mechanical terms is able to be compensated in the plane thereof without stresses being formed. Moreover, the dimensions of the support elements, i.e., in particular the components formed by the halves of the labyrinth seal, are selected relative to one another such that the flexible component located therebetween has sufficient space in order to permit corresponding movements relative to one another. Finally, the dimensions of the support elements may also be determined by the strength thereof to be achieved.

The advantage of the window pane fastening in accordance with embodiments is that when the window pane is positioned, it is simultaneously fixed in position. The flexible component, which is filled into the joints of one of the support elements before assembly, carries out the fixing directly after the window is positioned. It is also possible to provide the flexible component as a separate prefabricated component, i.e., the component may be inserted into one of the support elements before the window pane is mounted.

Combining the two support elements formed congruently relative to one another, each forming half of a labyrinth seal, with the flexible component located therebetween produces a clamping force as a result of the assembly. The webs of the support elements which are designed to be hard as well as the flexible component located therebetween produce a clamped connection effected by resilient deformation.

A spacer element or a spacer may also be provided, attached before mounting to one of the support elements or the window pane or the vehicle body component. The component formed, for example, as a profiled part ensures that the two support elements, the halves of the labyrinth seal, may be joined together to a predetermined degree specified by the thickness of the spacer element.

DRAWINGS

Embodiments are described by way of example below with reference to the drawings.

DESCRIPTION

Figure 1:
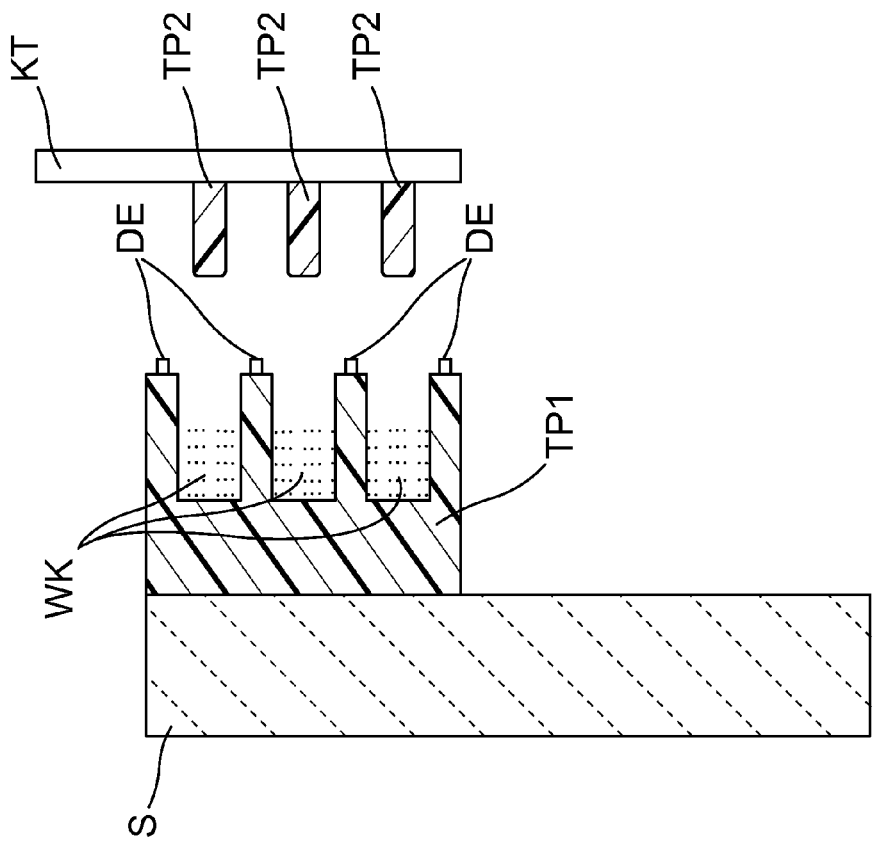
FIG. 1 illustrates a side view of an assembled window pane fastening in accordance with embodiments.

FIG. 1 illustrates a side view of an assembled window pane fastening in accordance with embodiments. The edge of a window pane S and a comb-shaped structural design of a first support element TP1 made of thermoplastic material is attached or connected along the edge S via injection-moulding. The first support element TP1 comprises a support body of rectangular cross-section having a plurality of grooves extending parallel to one another, the grooves also of rectangular cross section. Upon connection to the edge of the window pane S, the grooves are spatially oriented in a direction perpendicular relative to the plane of the window pane.

A second support element TP2 is attached to a vehicle body part KT and comprises a plurality of ribs extending parallel to one another, and engage in corresponding grooves of the first support element TP1, without the corresponding parts coming into contact. The grooves formed by the webs of the first support element TP1, as well as the ribs of the second support element TP2, thereby form a labyrinth seal.

The space between the grooves of the first support element TP1 and the ribs of the second support element TP2 is filled with a flexible component WK composed of a thermoplastic material. A spacer element DE is provided at the distal end of each web of the first support element TP1 and arranged between the window pane S and the vehicle body part KT in order to adjust the depth of penetration of the ribs of the second support element TP2 in the grooves of the first support element TP1. In particular, the spacer element DE is formed by a plurality of profiles arranged between the front faces of the webs of the first support element TP1 framing the grooves and the vehicle body part KT. The spacer elements DE are attached, for example, adhesively bonded, to the front faces of the webs of the first support element TP1 framing the grooves.

Figure 2:
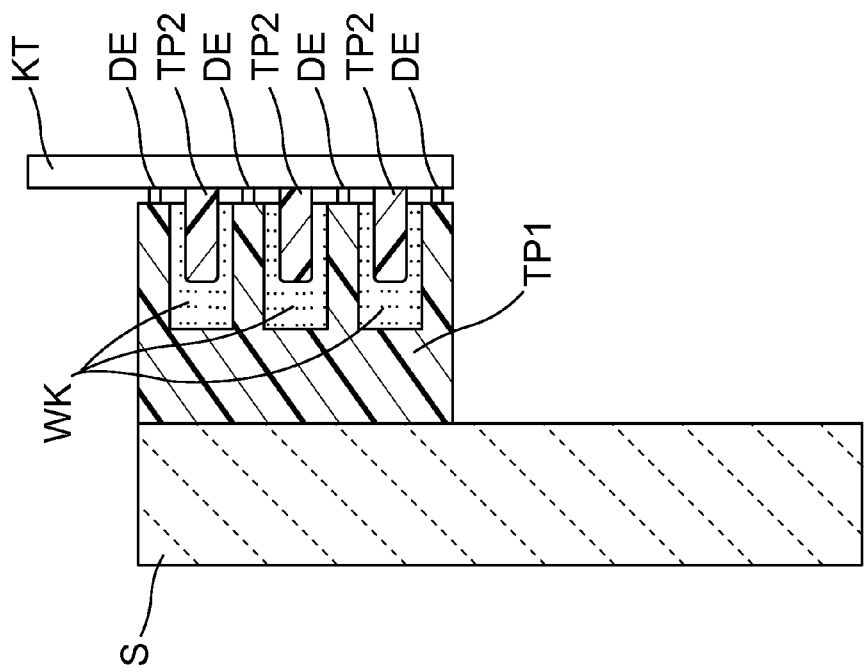
FIG. 2 illustrates a side view of an un-assembled window pane fastening in accordance with embodiments.

FIG. 2 illustrates the window pane fastening in accordance with embodiments before assembly. The thermoplastic flexible component WK is filled into the grooves formed by the webs of the first support element PT1. The flexible component WK, during assembly, is filled into the entire space between adjacent webs defining the grooves by plastic deformation and are engaged by the corresponding web of the second support element TP2.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

List of Reference Signs

S Window pane
TP1 First support element
TP2 Second support element
KT Vehicle body part
WK Flexible component
DE Spacer element

What is claimed is:

1. A window pane fastener for a motor vehicle, the window pane fastener comprising:
   a first support element having a support body attached to a window pane, the first support element having a plurality of spaced apart web members extending perpendicular relative to a plane of the window pane and in parallel to one another to define grooves therebetween;
   a plurality of second support elements spaced apart from each other and extending parallel to one another, each of said second elements being attached, at a first end thereof, to a body of the motor vehicle and received, at an opposing, second end thereof, in a corresponding one of the grooves;
   a plurality of flexible components spaced apart from each other, each one of the flexible components disposed in a corresponding one of the grooves and engaged by a corresponding one of the second support elements; and
   a plurality of spacer elements spaced apart from each other, each one of the plurality of spacer elements arranged between and contacting the first support element and the body of the motor vehicle, and each one of the plurality of spacer elements attached to and extending from a distal end of a corresponding one of the web members.

2. The window pane fastener of claim 1, wherein the second support elements comprise a plurality of ribs.

3. The window pane fastener of claim 1, wherein a depth of penetration of the second support elements into the grooves is determined by the spacer elements.

4. The window pane fastener of claim 1, wherein the first support element comprises a thermoplastic material.

5. The window pane fastener of claim 1, wherein the second support elements comprise a thermoplastic material.

6. The window pane fastener of claim 1, wherein the first support element and the second support elements each comprise a thermoplastic material.

7. The window pane fastener of claim 1, wherein the flexible components comprise a thermoplastic material.

8. The window pane fastener of claim 1, wherein at least one of the first support element and the second support elements are injection-moulded onto a respective one of the window pane and the motor vehicle body.

9. The window pane fastener of claim 1, wherein the first support element and the second support elements form a labyrinth seal.

10. The window pane fastener of claim 1, wherein the first support element, the second support elements and the flexible components each comprise a thermoplastic material.

11. The window pane fastener of claim 1, wherein each one of the spacer elements is adhesively bonded to said distal end of said corresponding one of the web members.

* * * * *